Figure 1:
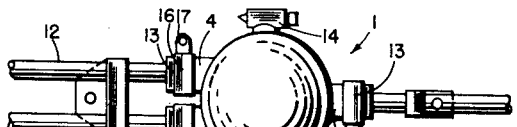

Jan. 15, 1963   W. O. WESSELER ETAL   3,073,888
ELECTRICAL CABLE CONNECTION BOX
Filed Oct. 4, 1960

INVENTORS
WILLIAM O. WESSELER
JENS K. SIEWERTSEN
BY
ATTORNEYS

United States Patent Office 3,073,888
Patented Jan. 15, 1963

3,073,888
ELECTRICAL CABLE CONNECTION BOX
William O. Wesseler, Rte. 5, Box 970, and Jens K. Siewertsen, 1614 Burwell St., both of Bremerton, Wash.
Filed Oct. 4, 1960, Ser. No. 60,534
4 Claims. (Cl. 174—65)
(Granted under Title 35, U.S. Code (1952), sec. 266)

The invention described herein may be manufactured and used by or for the Government of the United States of America for governmental purposes without the payment of any royalties thereon or therefor.

The invention relates to electrical cable enclosures such as branch or terminal enclosures or boxes of the type used for the mounting of switches, jacks, relays, and other small electrical fittings.

Electrical cable water-tight branch and connection boxes, such as are used in electrical shipboard installations, conventionally are formed of an enclosure or body portion having a gasketed cover, the boxes also being provided with specially drilled holes into which suitable terminal tubes must be closely fitted and packed or brazed to ensure water tightness. Usually, such enclosures are formed as metal boxes and, as will be appreciated, both the installation and material costs are quite high, particularly when multiplied by the very substantial number of boxes used.

Perhaps the greatest single factor contributing to the high cost is that each of these boxes must be formed on an individual basis with particular regard to the specific intended application. For example, the drilling of the cable entrance holes requires special layout and handling for each box. Also, the terminal tubes either must be brazed to the box, as when metal tubes are employed, or individually installed and packed when other tubes, such as those formed of nylon, are used. As a further consideration, such boxes must be specially formed in accordance with the number of cables to be connected as well as the particular size of cable contemplated. Obviously, it would be highly desirable to provide a standard form capable of handling different numbers as well as sizes of conductors.

The weight of these conventional boxes also is a troublesome factor in that they are so heavy as to require special stud and bolt mountings or supports. Consequently, a good portion of the installation cost is represented by the necessity for stud location layouts and the actual shooting of the studs. Also, when the box is formed of a metal or the terminal tubes of a metal, problems arise with respect to insulation and the need for grounding, as well as the more usual problems involved in corrosion resistance or the difficulties presented by sweating and condensation of moisture.

It is, therefore, a generalized object of the present invention to provide a simple and inexpensive connection box of such a form that one such box is capable of handling cables of varying size and number.

Another object is to provide a connection box in accordance with the last object, the box being of such lightness as to eliminate the necessity for securely bolting it to bulkheads or other extraneous supporting structure.

A more specific object is to provide an integrally-molded, one-piece box of such an arrangement as to eliminate the need for separate, specially-attached terminal tubes.

Yet another object is to provide a connection box of such an arrangement as to facilitate connection or disconnection of the cable conductors.

More generally, another object is to provide a box in accordance with the foregoing objects, the box being capable of demonstrating improved water tightness.

These and other objects are provided primarily by molding the connection box of a rubber-like material, such as neoprene, the box including, as part of its integral molded structure, sleeve-like extensions projecting outwardly from its side walls and communicating with the interior chamber of the box. The sleeve-like extensions are for the purpose of receiving the cables to be connected, such cables being inserted into the box chamber through the sleeves and the conductor connections then being made interiorly of the box. Preferably, the box is cylindrical in shape with a flat bottom and a wide, open top, providing ample access to facilitate the making of the conductor connections. To render the box water tight, a relatively hard cover is provided for the open top, this cover being tightly bound to the box by a clamp encircling the box itself. Preferably, the clamp is a steel band of a commercial variety provided with means for tensioning the band into a tight, compressive engagement with the box. Similar clamps also are employed on each of the box sleeves so as to compress the sleeves tightly against the cables inserted therein and thus provide a water tight fitting for the cables. As will be recognized, these clamps, most suitably, are of the type conventionally recognized as hose clamps or C-clamps.

Such a box fulfills the stated objects of the invention in a number of ways. First, it will be recognized that the integral molding of the sleeves with the body portion of the box eliminates the conventional requirement for specially brazing or otherwise attaching terminal tubes. The so-called hose clamps provide an unusually simple and effective means for assuring water tightness not only of the cables but the cover top, this top being formed of a relatively hard material so that the rubber-like material of the box itself can be compressed against it.

One particularly advantageous feature is that such a box can be made to accommodate a varying number of cables of varying size. For example, the box can be made with five sleeves so as to be capable of accommodating five cables. However, if the particular installation should require only three cables, two of the sleeves can be plugged by any suitable means and hose clamps can be employed to assure water tightness of the plugs. Obviously, the plugs themselves would be the equivalent of the cable which otherwise would be inserted into the vacant sleeve. As to the box being adapted for cables of varying sizes, one diameter of cable entrance sleeve hole will accommodate a number of sizes of cables and, in fact, the size of the cable is not too significant since the sleeve itself is a flexible material that can be compressed into sealing engagement. However, if the cable is too small, the rubber will wrinkle and present an unsightly appearance. If desired, this objectionable result can be avoided by the use of appropriate rubber sleeve inserts.

As to the support requirements for the present connection box, such is provided by simple, inexpensive supporting members which engage the cables externally of the box. This support is possible because the weight of the rubber box is little more than the weight of an equivalent length of cable. In fact, the weight is so slight that the box can be supported entirely by the cables so as, in effect, to be in a suspended condition, although customarily the box would rest upon a flat surface. One resulting advantage which may not be too apparent is that this support provides a resilient shock mount that is most important in shipboard use.

Figure 2:
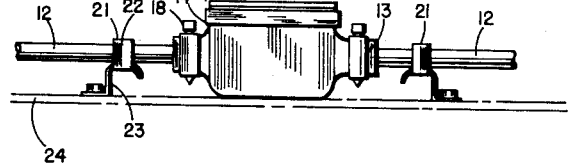
Figure 3:
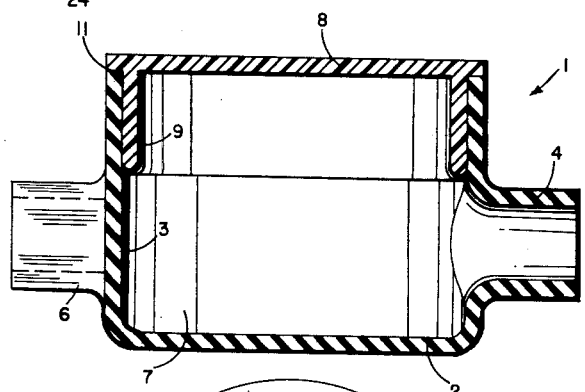
Figure 4:
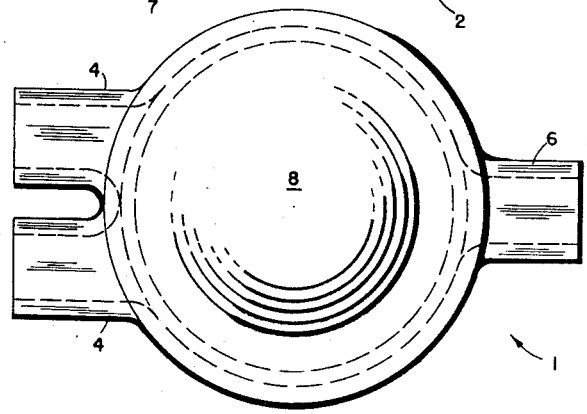

Preferred embodiments of the invention are illustrated in the accompanying drawings of which FIGS. 1 and 2 are top and side views respectively of a three cable box formed in accordance with the present invention;

FIG. 3 a central vertical section through the box shown in FIG. 1, the cables and clamps of FIG. 1 not being shown in this representation;

FIG. 4 a top view of the structure of FIG. 3; and

Figure 5:
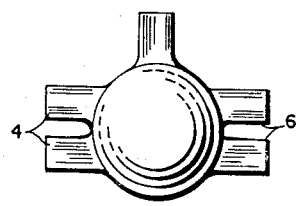

FIG. 5 a modification illustrating a box adapted to accommodate five cables.

Referring to the drawings, FIG. 1–4 show a box 1 formed of a bottom 2, a straight cylindrical side wall 3, and outwardly projecting sleeve extensions 4 and 6. The FIG. 5 modification is identical with FIG. 1 except that FIG. 5 shows two sleeves 6 rather than the single sleeve 6 of FIG. 1. Continuing with the description, it will be appreciated that these members provide a box having an interior chamber 7 as well as an open top of a dimension facilitating access to the chamber. A closure or cover 8 is provided for the open top, this cover being formed with a downwardly extending cylindrical flange 9 of such an outer diameter as to fit closely against the interior of side wall 3 of the box. Outwardly of cylindrical flange 9 is an annular flange 11 adapted to seat firmly against the upper edge of side wall 3.

One of the features of the invention is the fact that, except for cover 8, the entire box is integrally molded from a rubber-like material, such as neoprene. More generally, the rubber-like material should have a composition which offers high resistance to heat, fire, weather exposure, ozone, and sunlight so as, in effect, to be equal in these physical characteristics to the impervious sheath of electrical cable itself. The hardness may vary to considerable extent although it should be sufficiently rigid to demonstrate the requisite free-standing strength and it also should have sufficient resiliency to permit compressibility for purposes to be described. Obviously, aside from the chloroprene polymers known as neoprene, there will be a number of other rubbers, synthetic rubbers, or elastomers capable of present use.

As to the integral molding of the box, it is to be noted that its general shape favors a simple and relatively inexpensive, strippable mold operation. The importance of the integrally molded structure becomes apparent when it is recognized that it eliminates the prior art requirement for special and separate terminal tubes which, as has been explained, are expensive in that they must be affixed to the body portion by brazing or other means. The elimination of these terminal tubes is permissible because of the fact that sleeves 4, along with special sleeve-sealing means to be described, adequately replace their function.

Cover 8 also is formed of a special material at least to the extent that this material is relatively rigid as compared with the neoprene of box 1 and it also should be adequately resistant to environmental conditions. One appropriate material is a hard molded phenol plastic although other plastics or resins may be found to suffice.

As probably now is apparent, sleeves 4 and 6 are provided to receive the electrical cables to be connected interiorly of box 1, such cables being generally indicated in each of the figures by numeral 12. As seen in FIG. 1, three cables 12 are brought into box 1 by being inserted through sleeves 4 and 6. Preferably, although not necessarily, the diameter of the sleeve entrance hole approximates the diameter of the cable being connected. The approximation, however, can have sufficient leeway to accommodate at least several sizes of cables. For example, an 0.56 inch diameter hole will take a TSGA–3 (0.46 inch diameter) cable, a TSGA–4 (0.50 inch diameter) cable and a TSGA–9 (0.62 inch diameter) cable. Smaller diameter cables could be used with the 0.56 diameter hole but there would be a tendency for the synthetic rubber to wrinkle and present an unsightly appearance. In this event, if desired, any suitable sleeve (not shown) can be inserted to compensate for excess tolerance. In inserting the cables through the sleeves, it will be found helpful to utilize a sealant compound, such as Union Carbide Company formula T-1490, and such a compound should be applied sparingly to the cable, to provide lubrication for oversize cables and fill voids.

Interiorly of box 1, the conductors of the cables may be connected in various manners. For example, the conductors can be physically coupled utilizing presently known techniques or it also is feasible, if desired, to mount a terminal block in the cover itself or even make the block integral with the cover. The manner in which the conductors are joined is not of present interest and should need no further amplification.

Another quite important feature of the invention is the manner in which the connections are rendered water tight. Generally, this is accomplished by the use of conventional, commercially obtainable hose clamps 13 and 14, clamp 14 being more clearly shown in FIG. 2. These hose or C-clamps customarily are formed of stainless-steel banding 16 provided with the usual flanges 17 adapted to receive bolts 18 which, when tightened, compress the bands into tight engagement with their underlying members. As shown, one of these clamps 13 is detachably carried by each of the sleeves 4 and 6 so that, after the cable has been inserted through the sleeve, the clamps may be tightened to compress the sleeves into water tight engagement with the cables. A similar seal is used for cover 8 in that a clamp 14 encircles the upper portion of box side wall 3 and, when tightened, compresses this side wall against underlying flange 9 of the cover. The material form which the cover is made is of sufficient stiffness or hardness to permit the establishment of a tight seal between these two members.

Support for the box is provided by supporting means 21 which, as seen, engage directly with cables 12 exteriorly of the box. Each of these supporting means is formed of a saddle 22 through which one or more of the cables can be run and the saddle in turn is supported by a strap 23 adapted to be bolted to some extraneous structural surface, such as a bulkhead 24. Although, as shown in FIG. 2, box 1 rests on the bulkhead, it is not necessary to physically bolt the box to this bulkhead and, in fact, it would be entirely possible to suspend the box entirely by means of straps 23. As would be expected, the reason a support of this type is permissible is because of the extreme lightness of the box itself which, according to present specifications, is only about four ounces. Since this weight approximates the weight of equivalent lengths of this connected cables, it should be apparent that no additional support is required. A further advantage of this support, aside from eliminating the previous need for stud and bolt layouts, is that the support itself is an excellent shock mount.

The operation of the connection box has been considered in the foregoing description. Also, many of the advantages have been pointed out. Primarily, the present box is of significance because it provides a thoroughly effective watertight enclosure which can be fabricated and maintained at a relatively small cost. The principal feature enabling this result is the integral molding of the cable-receiving sleeves and the use of the hose-clamps for water tightness. Other advantages include its lightness which eliminates mounting problems, and the fact that the resilient compressibility of its sleeves permit a single box design to accommodate a variety of sizes and numbers of cables.

Obviously many modifications and variations of the present invention are possible in the light of the above teachings. It is therefore to be understood that within the scope of the appended claims the invention may be practiced otherwise than as specifically described.

What is claimed is:

1. An electrical cable connection box comprising an open-top chamber-forming body provided with a flat bottom wall, a cylindrical side wall, and at least three sleeve extensions projecting outwardly of said side wall at selected radially-spaced positions, said body portion along with said sleeves being integrally molded of a semi-rigid rubber-like material, a removable relatively-hard top cover having a cylindrical downwardly-extending flange closely and contiguously engaging the interior surface of said side wall and an annular flange overlying the top edge of the side wall, a removable flexible band encircling and sealably compressing the upper portion of said side wall against said interiorly-fitted cylindrical flange of said top cover, said sleeve extensions each communicating with said body chamber whereby the electrical cables to be connected can be inserted through selected sleeves into the chamber, and a separate flexible band encircling each of said sleeve extensions, said separate flexible bands each including means for sealably compressing the sleeve extensions for rendering said body chamber substantially water-tight.

2. The connection box of claim 1 wherein said body is formed of molded neoprene, and said cover is formed of a relatively hard plastic material.

3. The apparatus of claim 2 wherein said cover is formed of a hard molded phenol plastic material.

4. The connection box of claim 3 wherein said bands are formed of stainless steel.

References Cited in the file of this patent
UNITED STATES PATENTS

| | | |
|---|---|---|
| 2,333,266 | Miller | Nov. 2, 1943 |
| 2,635,132 | Rogoff | Apr. 14, 1953 |
| 2,978,533 | Colbert | Apr. 4, 1961 |